US008577824B2

(12) United States Patent
Langen et al.

(10) Patent No.: US 8,577,824 B2
(45) Date of Patent: Nov. 5, 2013

(54) METHOD AND A PROGRAMMABLE DEVICE FOR CALCULATING AT LEAST ONE RELATIONSHIP METRIC OF A RELATIONSHIP BETWEEN OBJECTS

(75) Inventors: Manfred Langen, München (DE); Karsten Ehms, München (DE); Walter Christian Kammergruber, Reut (DE)

(73) Assignee: Siemens Aktiengesellschaft, Munich (DE)

( * ) Notice: Subject to any disclaimer, the term of this patent is extended or adjusted under 35 U.S.C. 154(b) by 122 days.

(21) Appl. No.: 13/347,253

(22) Filed: Jan. 10, 2012

(65) Prior Publication Data

US 2013/0179392 A1  Jul. 11, 2013

(51) Int. Cl.
*G06F 17/00* (2006.01)
*G06F 7/00* (2006.01)
*G06N 99/00* (2010.01)
*G06F 17/30* (2006.01)

(52) U.S. Cl.
CPC ........ *G06N 99/005* (2013.01); *G06F 17/30864* (2013.01)
USPC ............................................. 706/45; 707/705

(58) Field of Classification Search
None
See application file for complete search history.

(56) References Cited

U.S. PATENT DOCUMENTS

| 7,792,836 | B2 * | 9/2010 | Taswell | 707/737 |
|---|---|---|---|---|
| 2008/0016020 | A1 * | 1/2008 | Estes | 706/52 |
| 2008/0104032 | A1 * | 5/2008 | Sarkar | 707/3 |
| 2008/0168420 | A1 * | 7/2008 | Sabbouh | 717/104 |
| 2008/0301174 | A1 * | 12/2008 | Mons et al. | 707/102 |
| 2008/0313229 | A1 * | 12/2008 | Taswell | 707/104.1 |
| 2010/0100546 | A1 * | 4/2010 | Kohler | 707/739 |
| 2010/0174675 | A1 * | 7/2010 | Mons et al. | 707/603 |
| 2010/0174739 | A1 * | 7/2010 | Mons et al. | 707/769 |
| 2011/0040796 | A1 * | 2/2011 | Shockro et al. | 707/794 |

\* cited by examiner

*Primary Examiner* — Alan Chen
(74) *Attorney, Agent, or Firm* — King & Spalding L.L.P.

(57) ABSTRACT

A method for calculating at least one relationship metric of a relationship between objects has the steps of providing a multi-layered relationship network with a first relationship layer derived from potential relations between objects, a second relationship layer derived from interactions between objects, a third relationship layer derived from explicit relations between objects, and an aggregated relationship layer derived from at least two layers of the relationship layers, and wherein each layer has a graph with one vertex for every object represented in the network and at least one unidirectional and/or bidirectional edge between at least two of the objects, and calculating the edge weights based on the edge weights of at least two relationship layers, selecting at least the relationship with a highest edge weight between an object and other objects, and finally outputting the weights of the selected relationships as the calculated relationship metrics.

18 Claims, 3 Drawing Sheets

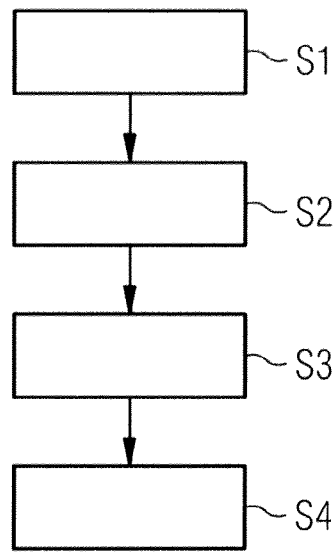
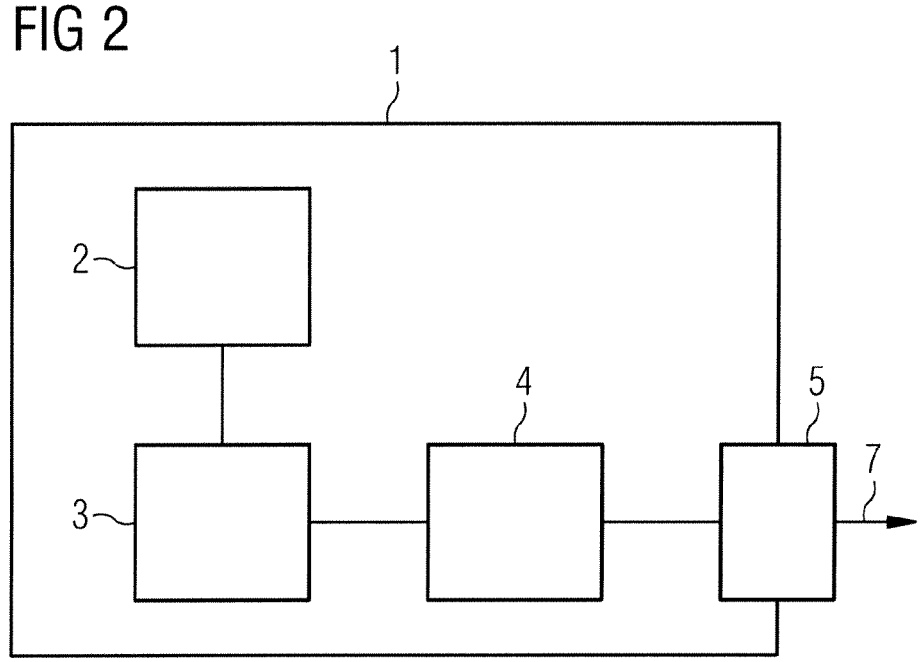

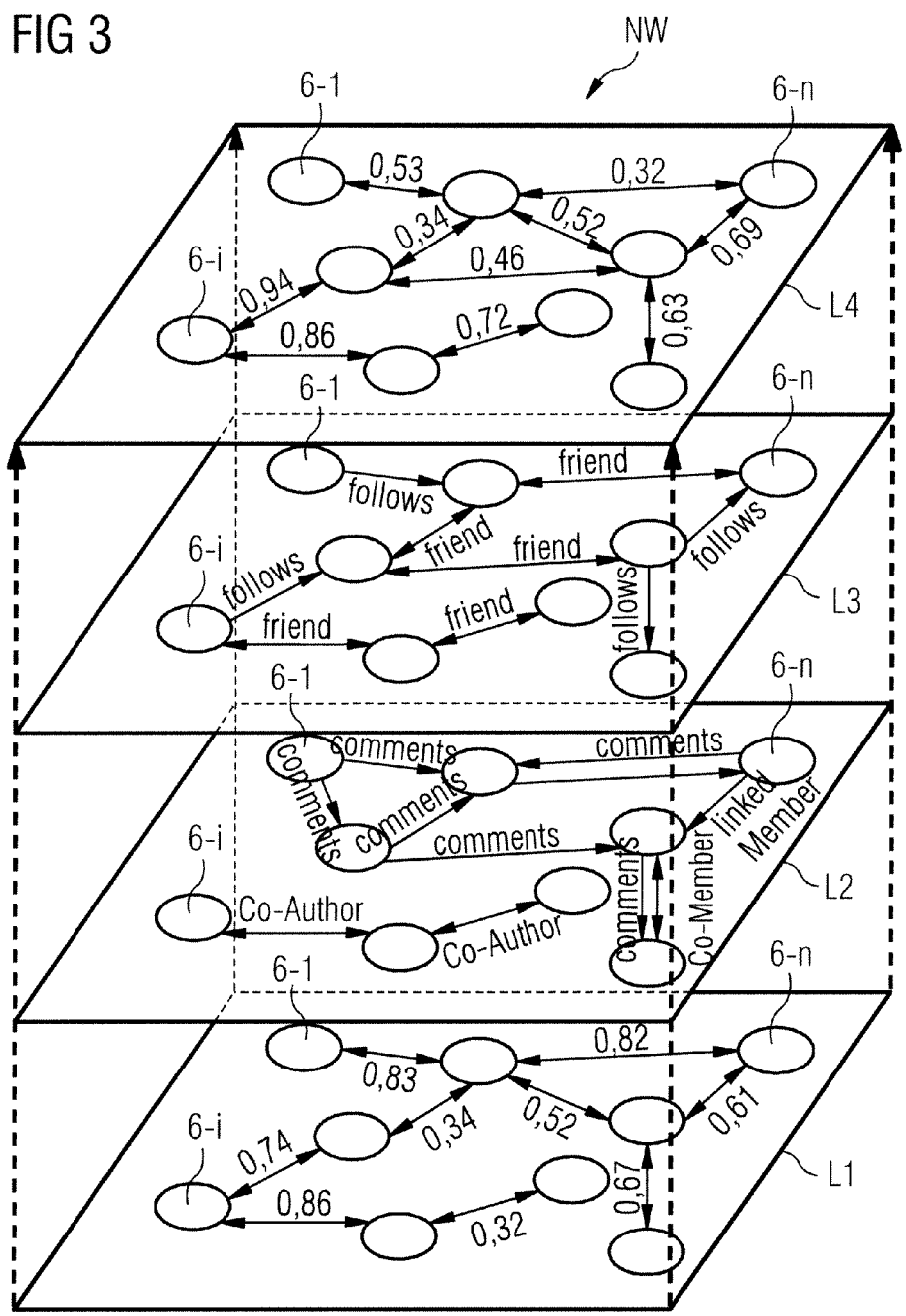

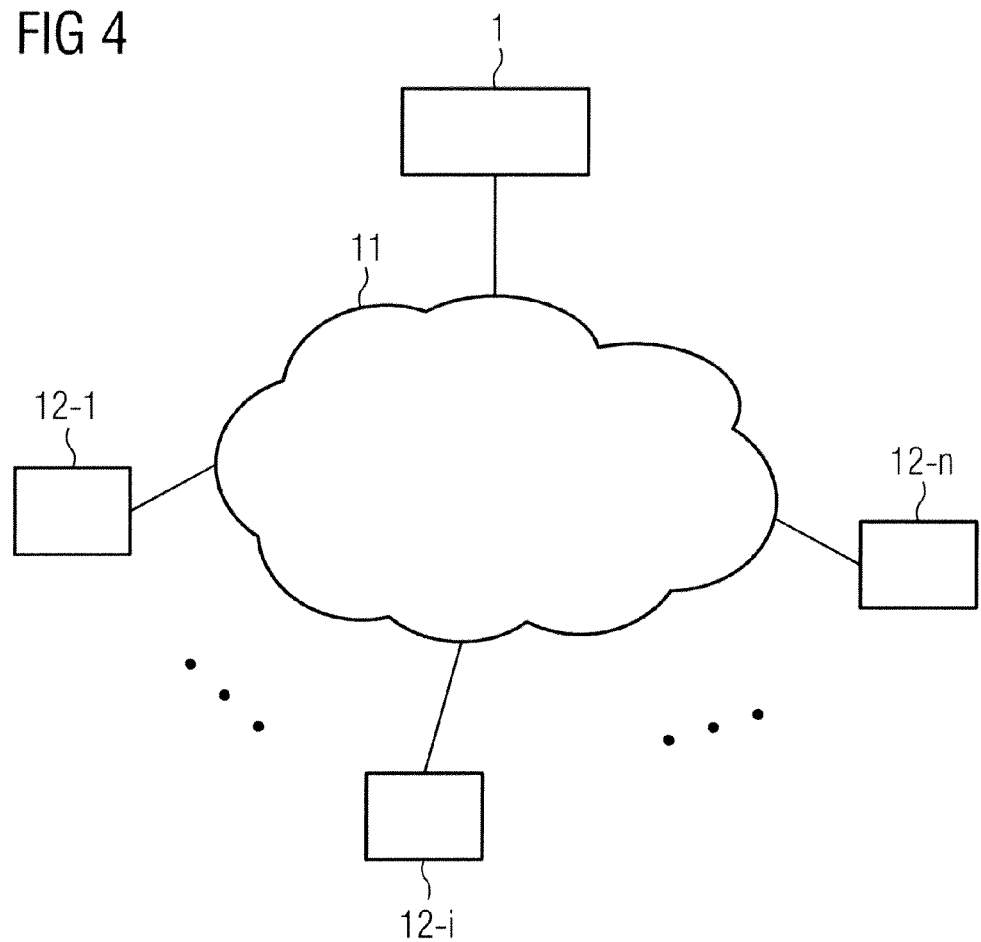

METHOD AND A PROGRAMMABLE DEVICE FOR CALCULATING AT LEAST ONE RELATIONSHIP METRIC OF A RELATIONSHIP BETWEEN OBJECTS

TECHNICAL FIELD

The invention relates to a method and to an apparatus for calculating at least one relationship metric of a relationship between objects.

BACKGROUND

Although applicable to any system that uses relationships between objects to target information, the present invention will be described in combination with social networks or search engines.

Modern electronic systems like for example search engines or social networks are adapted to provide their users with detailed information about a term searched by said user or about the activities of other users.

Such modern electronic systems comprise databases with a virtually unlimited amount of information. Providing a user with all this information in an unfiltered fashion would confuse users and probably render the electronic systems useless for any user. Furthermore, providing information to user that is not related to any interest of said users would provoke the users to look for alternative sources of information.

In order to provide the user only with information that he is most likely interested in, such modern electronic systems are adapted to provide the user with information that is adapted for example based on the social relations of said user. Therefore, such modern electronic systems can comprise a database containing the social relations of a user. Such social relations could for example be defined as being a friend of another user, as being a follower of another user's publications or as being a fan of another user.

In order to provide a filtered or targeted selection of information to a specific user electronic systems select only that information for display to a user, which is generated by other users that are related (e.g. as friends or their common interest in the same topic) to said user.

Targeting information based on the social relations of a user provides limited targeting options. A user could be a friend of another user but not be interested in that other user's picture gallery. Thus, providing said user for example with the content generated by the other user would not give said user better targeted information.

Accordingly, there is a need for a method and an apparatus for providing a better targeted information.

SUMMARY

According to an embodiment, a method for calculating at least one relationship metric of a relationship between objects, the method comprising the steps of a) providing a multi-layered relationship network comprising at least: a first relationship layer derived from potential relations between objects, wherein potential relationships between objects are derived from semantic metrics related to said objects; a second relationship layer derived from interactions between objects, wherein interactions between objects comprise interactions of objects with content generated by other objects; a third relationship layer derived from explicit relations between objects, wherein explicit relations are relations defined by at least one of the objects; and an aggregated relationship layer derived from at least two layers of the first to third relationship layers; and wherein each layer comprises a graph comprising one vertex for every object represented in the multi-layered relationship network and at least one unidirectional and/or bidirectional edge between at least two of said vertices; b) calculating the weights of the edges of said aggregated relationship layer based on the weights of the edges of at least two relationship layers selected from the first to third relationship layers; c) selecting at least one relationship between an object and other objects related to said object from the aggregated relationship layer; d) outputting the calculated weights of the selected relationships as the calculated relationship metrics.

According to a further embodiment, the weights of the edges of the first relationship layer can be calculated using terms and/or tags and/or words used and/or published by the objects. According to a further embodiment, the weights of the edges of the second layer can be calculated based on interactions of objects with content generated by other objects. According to a further embodiment, the interactions may comprise commenting and/or co-authoring and/or tagging and/or reading by one user content generated by another user. According to a further embodiment, the weights of the edges of the third relationship layer can be calculated based on explicit relationship statuses actively selected by at least one object. According to a further embodiment, the explicit relationship statuses may comprise a friend status and/or a follower status and/or a fan status. According to a further embodiment, the weight of an edge may have a fixed value based on the type of explicit relation; or wherein the weight of an edge may be based on the total number of explicit relations of an object. According to a further embodiment, the weights of the edges of at least one layer of the first to third relationship layer can be set to a negative value to penalize a relation. According to a further embodiment, the weights of the edges of the aggregated relationship layer can be calculated by arithmetically combining the weights of the edges of at least two relationship layers of the first to third relationship layers. According to a further embodiment, the weights of the edges of the aggregated relationship layer can be calculated by adding the weights of the edges of at least two layers of the first to third relationship layers. According to a further embodiment, the weights of the edges of the aggregated relationship layer can be calculated by multiplying the weights of the edges of at least two relationship layers of the first to third relationship layers with correctional factors ant adding the multiplied weights of the edges. According to a further embodiment, the weights of the edges of the aggregated relationship layer can be calculated by multiplying the weights of the edges of at least two relationship layers of the first to third relationship layers. According to a further embodiment, the weights of the edges of the first to third relationship layers can be normalized before deriving the aggregated layer. According to a further embodiment, the objects may comprise persons and/or companies and/or institutional entities.

According to another embodiment, a programmable device for calculating at least one relationship metric of a relationship between objects, especially using the method of one of the preceding claims, may comprise: a memory configured for storing a multi-layered relationship network, the multi-layered relationship network comprising at least: a) a first relationship layer derived from potential relations between objects, wherein potential relationships between objects are derived from semantic metrics related to said objects; a second relationship layer derived from interactions between objects, wherein interactions between objects comprise interactions of objects with content generated by other objects; a third relationship layer derived from explicit relations between objects, wherein explicit relations are relations explicitly defined by at least one of the objects; and an aggregated relationship layer derived from at least two layers of the first to third relationship layers; and wherein each layer comprises a graph comprising one vertex for every object represented in the multi-layered relationship network and at least one unidirectional and/or bidirectional edge between at least two of said vertices; b) a computing unit configured to calculate the weights of the edges of the aggregated relationship layer based on the weights of the edges of at least two relationship layers selected from the first to third relationship layers, c) a selection unit configured to select one relationship between one first object and the objects related to said first object from the aggregated relationship layer; and d) an interface unit configured to output the calculated weights of the selected relationships as the calculated relationship metrics.

According to a further embodiment of the device, the device can be a search engine and the device can be configured to position search results and/or advertisements based on the calculated relationship metrics. According to a further embodiment of the device, the device can be a server of a social network and the device is configured to filter activity reports of users of the social network based on the calculated relationship metrics. According to a further embodiment of the device, the device can be a server of a content management system and the device can be configured to suggest tags for tagging a first user's content based on the calculated relationship metrics between said first user and other users of said content management system.

BRIEF DESCRIPTION OF THE DRAWINGS

In the following possible embodiments and implementations of the method and the programmable device according to the present invention are described with reference to the enclosed figures.

FIG. 1 shows a flow diagram of a possible embodiment of a method;

FIG. 2 shows a block diagram of a possible embodiment of a programmable device;

FIG. 3 shows a diagram of a possible embodiment of a multi-layered relationship network;

FIG. 4 shows a block diagram of a network comprising a possible embodiment of a programmable device.

DETAILED DESCRIPTION

According to an embodiment, a method for calculating at least one relationship metric of a relationship between objects may comprise the steps of:
a) providing a multi-layered relationship network comprising at least: a first relationship layer derived from potential relations between objects, wherein potential relationships between objects are derived from semantic metrics related to said objects;
  a second relationship layer derived from interactions between objects, wherein interactions between objects comprise interactions of objects with content generated by other objects;
  a third relationship layer derived from explicit relations between objects, wherein explicit relations are relations defined by at least one of the objects; and
  an aggregated relationship layer derived from at least two layers of the first to third relationship layers; and wherein each layer comprises a graph comprising one vertex for every object represented in the multi-layered relationship network and at least one unidirectional and/or bidirectional edge between at least two of said vertices;
b) calculating the weights of the edges of said aggregated relationship layer based on the weights of the edges of at least two relationship layers selected from the first to third relationship layers;
c) selecting at least one relationship between an object and other objects related to said object from the aggregated relationship layer;
d) outputting the weights of the selected relationships as the calculated relationship metrics.

According to another embodiment, a programmable device for calculating at least one relationship metric of a relationship between objects, especially using the method of one of the preceding claims, may comprise:
a) a memory configured for storing a multi-layered relationship network, the multi-layered relationship network comprising at least:
  a first relationship layer derived from potential relations between objects, wherein potential relationships between objects are derived from semantic metrics related to said objects;
  a second relationship layer derived from interactions between objects, wherein interactions between objects comprise interactions of objects with content generated by other objects;
  a third relationship layer derived from explicit relations between objects, wherein explicit relations are relations explicitly defined by at least one of the objects; and
  an aggregated relationship layer derived from at least two layers of the first to third relationship layers; and wherein each layer comprises a graph comprising one vertex for every object represented in the multi-layered relationship network and at least one unidirectional and/or bidirectional edge between at least two of said vertices;
b) a computing unit configured to calculate the weights of the edges of the aggregated relationship layer based on the weights of the edges of at least two relationship layers selected from the first to third relationship layers.
c) a selection unit configured to select at least one relationship between one first object and the objects related to said first object from the aggregated relationship layer; and
d) an interface unit configured to output the weights of the selected relationships as the calculated relationship metrics.

The various embodiments are based on the conclusion that every object provides a major amount of information regarding relationships between said object and other objects when using modern electronic systems.

Therefore, the various embodiments use this knowledge to provide a flexible relationship metric that can easily be adapted to different applications.

Using the method and/or apparatus provided by the various embodiments it is possible to provide different electronic systems like for example search engines or social network applications with a possibility to specifically target information to specific objects.

In a possible embodiment the weights of the edges of the first relationship layer are calculated using terms and/or tags and/or words used and/or published by the objects. This allows automatic creation of a basis for the relationship metric based on content published by an object.

In another possible embodiment the weights of the edges of the second layer are calculated based on interactions of objects with content generated by other objects. This allows to automatically generate a basis for the relationship metric based on implicit relationship details which a user does not actively publish but which a user publishes by acting with or on the content generated by another object.

In another possible embodiment the interactions comprise commenting and/or co-authoring and/or tagging and/or reading by one user content generated by another user. This allows including the most relevant interactions in modern communication applications or internet applications in the automatic calculation of the relationship metric.

In another possible embodiment the weights of the edges of the third relationship layer are calculated based on explicit relationship statuses actively selected by at least one object. This allows calculating the relationship metric based on the known relationships of an object.

In another possible embodiment the explicit relationship statuses comprise a friend status and/or a follower status and/or a fan status. This allows including the most relevant relationship statuses used in modern communication applications or internet applications in the automatic calculation of the relationship metric.

In another possible embodiment the weight of an edge has a fixed value based on the type of explicit relation. In another possible embodiment the weight of an edge is based on the total number of explicit relations of an object. A fixed weight allows for a fast and simple calculation of the weight of an edge which represents a relationship. Using the weight of an edge that is based on the total number of explicit relations of an object allows to dynamically adapt the weight. The features of this embodiment are based on the assumption that if a user has a low number of relationships that relationships will be of a higher Quality than relationships of a user that has a great number of relationships. If for example an object, which could be a user of a social network, only has 10 "friends", it is very likely that the user will closely follow his "friends" activities. If a user has 500 or more "friends" in a social network it is very unlikely that a user will closely follow all his "friends" activities. Thus, basing the weight of an edge in a relationship layer on the total number of relations of an object allows to dynamically weight the relationships of users with a high number of relationships as less relevant than the relationships of users with a little number of relationships.

In another possible embodiment the weights of the edges of at least one layer of the first to third relationship layers are set to a negative value to penalize a relation. This allows specifically selecting single relationships that should be penalized. For example, in a social network only those users could be selected, which are no "friends" of another user by penalising a "friend" relationship with a negative edge weight.

In another possible embodiment the weights of the edges of the aggregated relationship layer are calculated by arithmetically combining the weights of the edges of at least two relationship layers of the first to third relationship layers. Selecting at least two relationship layers to arithmetically combine their edge weights into the edge weights of the aggregated relationship layer allows a very flexible calculation of the relationship metric.

In another possible embodiment the weights of the edges of the aggregated relationship layer are calculated by adding the weights of the edges of at least two layers of the first to third relationship layers. This allows very simple and effective calculation of the relationship metric.

In another possible embodiment the weights of the edges of the aggregated relationship layer are calculated by multiplying the weights of the edges of at least one relationship layer of the first to third relationship layers with correctional factors and adding the multiplied weights of the edges of at least two relationship layers. In another possible embodiment the weights of the edges of the aggregated relationship layer are calculated by multiplying the weights of the edges of at least two relationship layers of the first to third relationship layers. This allows dynamically modifying the impact of every relationship layer's edge weights on the calculated relationship metric.

In another possible embodiment the weights of the edges of the first to third relationship layers are normalized before deriving the aggregated layer.

In another possible embodiment the objects comprise persons and/or companies and/or institutional entities. This allows to adapt the various embodiments to different applications and to use the various embodiments in a variety of different systems.

In another possible embodiment the device is a search engine and the device is configured to position search results and/or advertisements based on the calculated relationship metrics. This allows specific marketing targeting, wherein the advertisements presented to the objects, for example users, and the order of said advertisements are selected by the search engine based on the relationship metric.

In another possible embodiment the device is a server of a social network and the device is configured to filter activity reports of users of the social network based on the calculated relationship metrics. This allows presenting a user with activity reports of other users of the social network, that relate to the interests of said user independent of the relationship status between the users.

In another possible embodiment the device is a server of a content management system and the device is configured to suggest tags for tagging a first user's content based on the calculated relationship metrics between said first user and other users of said content management system. This provides an effective aid in tagging for example articles of a user because the probability that users which are related one to another will use the same tags is very high.

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

FIG. 1 shows a flow diagram of a possible embodiment of a method.

According to FIG. 1 a first step S1 of the method consists in providing a multi-layered relationship network MW. According to an embodiment a multi-layered relationship network MW comprises a first relationship layer L1 derived from potential relations between objects 6-1-6-n, wherein potential relationships between objects 6-1-6-n are derived from semantic metrics related to said objects 6-1-6-n, a second relationship layer L2 derived from interactions between objects 6-1-6-n, wherein interactions between objects 6-1-6-n comprise interactions of objects 6-1-6-n with content generated by other objects 6-1-6-n, a third relationship layer L3 derived from explicit relations between objects 6-1-6-n, wherein explicit relations are relations defined by at least one of the objects 6-1-6-n, and an aggregated relationship layer L4 derived from at least two layers L1-L3 of the first to third relationship layers L1-L3. Furthermore, each layer L1-L4 comprises a graph comprising one vertex for every object 6-1-6-n represented in the multi-layered relationship network MW and at least one unidirectional and/or bidirectional edge between at least two of said vertices.

In a second step S2 the weights of the edges of said aggregated relationship layer L4 are calculated based on the weights of the edges of at least two relationship layers L1-L3 selected from the first to third relationship layers L1-L3.

In a third step S3 at least the relationship with a highest edge weight between an object 6-1-6-n and other objects 6-1-6-n related to said object 6-1-6-n is selected from the aggregated relationship layer L4.

Finally, in a fourth step S4 the weights of the selected relationships are outputted as the calculated relationship metrics 7.

FIG. 2 shows a block diagram of a possible embodiment of a programmable device 1.

In FIG. 2 the programmable device 1 for calculating at least one relationship metric of a relationship between objects 6-1 to 6-n comprises a memory 2 configured for storing a multi-layered relationship network NW. In a possible embodiment a multi-layered relationship network NW comprises a first relationship layer L1 of derived from potential relations between objects 6-1 to 6-n. In the first relationship layer L1 potential relationships between objects are derived from semantic metrics related to said objects 6-1-6-n. Furthermore, the multi-layered relationship network NW comprises a second relationship layer L2 derived from interactions between objects 6-1-6-n, wherein interactions between objects 6-1-6-n comprise interactions of objects 6-1-6-n with content generated by other objects 6-1-6-n. The multi-layered relationship network NW further comprises a third relationship layer L3 derived from explicit relations between objects 6-1-6-n, wherein explicit relations are relations explicitly defined by at least one of the objects 6-1-6-n. Finally, the multi-layered relationship network NW comprises an aggregated relationship layer L4 derived from at least two layers L1-L3 of the first to third relationship layers L1-L3. In the multi-layered relationship network NW each layer L-L4 comprises a graph comprising one vertex for every object 6-1-6-n represented in the multi-layered relationship network and at least one unidirectional and/or bidirectional edge between at least two of said vertices.

In one embodiment the multi-layered relationship network NW is stored as at least one tree like memory structure. In another embodiment the multi-layered relationship network NW is stored as at least one linked list like memory structure, array like memory structure or multidimensional array like memory structure. In another embodiment the multi-layered relationship network NW is stored in a database.

The programmable device 1, furthermore, comprises a computing unit 3 configured to calculate the weights of the edges of the aggregated relationship layer L4 based on the weights of the edges of at least two relationship layers L1-L3 selected from the first to third relationship layers L1-L3.

In one embodiment the computing unit 3 is embodied in a microprocessor 3. In another embodiment the computing unit 3 is embodied in a central processing unit of a personal computer, in a configurable logic device, like for example an FPGA, or the like. In another embodiment the computing unit 3 is embodied as a computer program product.

The programmable device 1, furthermore, comprises a selection unit 4 configured to select at least one relationship between one first object 6-1 to 6-n and the objects 6-1 to 6-n related to said first object from the aggregated relationship layer L4. In one embodiment the selection unit 4 is configured to select at least the relationship with highest edge weight between one first object 6-1 to 6-n and the objects 6-1 to 6-n related to said first object.

Finally, the programmable device 1 comprises an interface unit 5 configured to output the weights of the selected relationships as the calculated relationship metrics 7.

In one embodiment the interface unit 5 is embodied as a memory interface unit 5 of the computing unit 3. In another embodiment the interface unit 5 is embodied as a network interface unit 5. In yet another embodiment the interface unit 5 is embodied as an application programming interface 5 (API) that defines how to access the programmable device 1 from other computer applications.

If the interface unit 5 is embodied as an application programming interface 5, the method according to various embodiments can be embodied as computer readable instructions executed by a processor of a network server. In such an embodiment another computer implemented system, like for example a search engine, could request a specific relationship metric from the network server by accessing said network server via a data network. The computer implemented system would send a message containing data requesting a relationship metric according to the API 5 to the server and the server would reply to said request with a data message containing the requested relationship metric.

In one embodiment the method is embodied as a Web Service and the API 5 is defined as a "REST-ful" API.

The Acronym "REST" refers to "Representational State Transfer". In REST-style architectures clients initiate requests to servers and the servers process requests and return appropriate responses. Requests and responses are built around the transfer of representations of resources, in this case for example objects, users, relationships or the like.

FIG. 3 shows a diagram of a possible embodiment of a multi-layered relationship network NW.

In the shown example the multi-layered relationship network NW comprises four layers L1 to L4. The multi-layered relationship network NW comprises a first relationship layer L1 derived from potential relations between objects 6-1-6-n, a second relationship layer L2 derived from interactions between objects 6-1-6-n, a third relationship layer L3 derived from explicit relations between objects 6-1-6-n and, finally, an aggregated relationship layer L4 derived from at least two layers L1-L3 of the first to third relationship layers L1-L3.

In the example shown in FIG. 3 potential relationships between objects 6-1-6-n are derived from semantic metrics related to said objects 6-1-6-n. Semantic metrics relate to publications, especially in form of text documents, blog entries, comments and the like an object 6-1-6-n publishes or consumes. Such semantic metrics can be calculated for specific terms, words or tags of said publications. In one embodiment the weight of the edge between two vertices is computed by building vectors containing the occurrences of specific terms in the publications of two objects 6-1-6-n and calculating a cosine-distance of said vectors. In another embodiment the weights of the edges are calculated by edge-based, node-based, pair wise or group wise semantic similarity metrics.

Furthermore, in the example shown in FIG. 3 interactions between objects 6-1-6-n comprise interactions of objects with content generated by other objects 6-1-6-n. Interactions on content, for example text documents or blog entries, can comprise at least commenting on content or co-authoring content. In other examples interactions with content can include reading, forwarding or the like of said content.

Finally, in the example shown in FIG. 3 explicit relations are relations explicitly defined by at least one of the objects 6-1-6-n. Such an explicit relation can be created, for example, by defining an object 6-1-6-n, for example a user, of a social network as friend. In another example such an explicit relation can be defined by an object 6-1-6-n by defining itself as fan or follower of another object 6-1-6-n. According to one embodiment a follower or fan relationship is a unidirectional relationship and a friend relationship is a bidirectional relationship.

In the example shown in FIG. 3 the weights of the edges in the aggregated relationship layer L4 are calculated by firstly assigning a specific weight to every possible interaction and to every explicit relation. The edge weights of the aggregated relationship layer L4 can then be calculated by multiplying the corresponding edge weights of the first to third relationship layers L1-L3. In another embodiment the edge weights of the aggregated relationship layer L4 are calculated by adding or subtracting the corresponding edge weights of the first to third relationship layers L1-L3. In yet another embodiment the edge weights of the aggregated relationship layer L4 are calculated by defining a mathematical formula for the calculation of the edge weights. In such an embodiment the weights of the edges of one relationship layer L1-L3 can be multiplied or divided with a specific value and then be added to corresponding sum of the weights of the edges of the remaining relationship layers L1-L3. Alternative mathematical transformations from the edge weights of the relationship layers L1-L3 to the weights of the edges of the aggregated relationship layer L4 are possible.

FIG. 4 shows a block diagram of a network comprising a possible embodiment of a programmable device 1.

The programmable device 1 in FIG. 4 is a server of a social network or an online collaboration platform. The cloud symbol in FIG. 4 refers to a network 11, for example the internet 11. Finally FIG. 4 comprises a plurality of workstations 12-1 to 12-n which can be used by users of the social network or the online collaboration platform. In another embodiment the network 11 can be embodied as an Intranet, especially a company's intranet, a virtual private network or the like.

If a user logs on to the social network using one of the workstations 12-1-12-n an update of the activities of all users related to said user is presented to said user.

In order to decide which updates to present to the user the social network will retrieve a plurality of relationship metrics 7 using the programmable device 1. By using a relationship metric 7 the social network can present the user not only with updates about other user that are related to said user but the social network can also present updates or information to said user that refers to other users of the social network, which are not directly related to said user. Such other users could for example be users interested in similar activities or working on similar projects. Using the programmable device 1 the social network can explicitly identify other users that are not already related to said user but provide content which is of interest the identified users to said user. This can for example be achieved by assigning a negative weight to a "friend" relation in the third relationship layer L3.

In another embodiment a user of an online collaboration platform is aided in tagging articles or documents generated by him or other users of said online collaboration platform. The online collaboration platform can identify other users that have a close link to said user using the programmable device 1 and then can supply said user with suggestions for tags, which are commonly used by those users closely related to him.

The accompanying drawings are included to provide a further understanding of the various embodiments and are incorporated in and constitute a part of this specification. The drawings illustrate the embodiments and together with the description serve to explain the principles of various embodiments. Other embodiments and many of the intended advantages of the various embodiments will be readily appreciated as they become better understood by reference to the following detailed description. The elements of the drawings are not necessarily drawn to scale relative to each other. Like reference numerals designate corresponding similar parts.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

List of Reference Signs
1 programmable device
2 memory
3 computing unit
4 selection unit
5 interface unit
6-1-6-n object
7 relationship metric
11 data network
12-1-12-n workstations
S1-S4 method steps
NW relationship network

What is claimed is:
1. A method for calculating at least one relationship metric of a relationship between objects, the method comprising the steps of:
a) providing a multi-layered relationship network comprising at least:
a first relationship layer derived from potential relations between objects, wherein potential relationships between objects are derived from semantic metrics related to said objects;
a second relationship layer derived from interactions between objects, wherein interactions between objects comprise interactions of objects with content generated by other objects;
a third relationship layer derived from explicit relations between objects, wherein explicit relations are relations defined by at least one of the objects; and an aggregated relationship layer derived from at least two layers of the first to third relationship layers; and wherein each layer comprises a graph comprising one vertex for every object represented in the multi-layered relationship network and at least one unidirectional and/or bidirectional edge between at least two of said vertices;

b) calculating the weights of the edges of said aggregated relationship layer based on the weights of the edges of at least two relationship layers selected from the first to third relationship layers;

c) selecting at least one relationship between an object and other objects related to said object from the aggregated relationship layer;

d) outputting the calculated weights of the selected relationships as the calculated relationship metrics.

2. The method of claim 1, wherein the weights of the edges of the first relationship layer are calculated using at least one of terms, tags, words used, and words published by the objects.

3. The method of claim 1, wherein the weights of the edges of the second layer are calculated based on interactions of objects with content generated by other objects.

4. The method of claim 3, wherein the interactions comprise at least one of commenting, co-authoring, tagging, and reading by one user content generated by another user.

5. The method of claim 1, wherein the weights of the edges of the third relationship layer are calculated based on explicit relationship statuses actively selected by at least one object.

6. The method of claim 5, wherein the explicit relationship statuses comprise at least one of a friend status, a follower status, and a fan status.

7. The method of claim 5, wherein the weight of an edge has a fixed value based on the type of explicit relation; or
wherein the weight of an edge is based on the total number of explicit relations of an object.

8. The method of claim 1, wherein the weights of the edges of at least one layer of the first to third relationship layer are set to a negative value to penalize a relation.

9. The method of claim 1, wherein the weights of the edges of the aggregated relationship layer are calculated by arithmetically combining the weights of the edges of at least two relationship layers of the first to third relationship layers.

10. The method of claim 1, wherein the weights of the edges of the aggregated relationship layer are calculated by adding the weights of the edges of at least two layers of the first to third relationship layers.

11. The method of claim 1, wherein the weights of the edges of the aggregated relationship layer are calculated by multiplying the weights of the edges of at least two relationship layers of the first to third relationship layers with correctional factors ant adding the multiplied weights of the edges.

12. The method of claim 1, wherein the weights of the edges of the aggregated relationship layer are calculated by multiplying the weights of the edges of at least two relationship layers of the first to third relationship layers.

13. The method of claim 1, wherein the weights of the edges of the first to third relationship layers are normalized before deriving the aggregated layer.

14. The method of claim 1, wherein the objects comprise at least one of persons, companies, and institutional entities.

15. A programmable device for calculating at least one relationship metric of a relationship between objects, the device comprising:

a) a memory configured for storing a multi-layered relationship network, the multi-layered relationship network comprising at least:

a first relationship layer derived from potential relations between objects, wherein potential relationships between objects are derived from semantic metrics related to said objects;

a second relationship layer derived from interactions between objects, wherein interactions between objects comprise interactions of objects with content generated by other objects;

a third relationship layer derived from explicit relations between objects, wherein explicit relations are relations explicitly defined by at least one of the objects; and an aggregated relationship layer derived from at least two layers of the first to third relationship layers; and wherein each layer comprises a graph comprising one vertex for every object represented in the multi-layered relationship network and at least one unidirectional and/or bidirectional edge between at least two of said vertices;

b) a computing unit configured to calculate the weights of the edges of the aggregated relationship layer based on the weights of the edges of at least two relationship layers selected from the first to third relationship layers.

c) a selection unit configured to select one relationship between one first object and the objects related to said first object from the aggregated relationship layer; and d) an interface unit configured to output the calculated weights of the selected relationships as the calculated relationship metrics.

16. The device of claim 15, wherein the device is a search engine and the device is configured to position at least one of search results and advertisements based on the calculated relationship metrics.

17. The device of claim 15, wherein the device is a server of a social network and the device is configured to filter activity reports of users of the social network based on the calculated relationship metrics.

18. The device of claim 15, wherein the device is a server of a content management system and the device is configured to suggest tags for tagging a first user's content based on the calculated relationship metrics between said first user and other users of said content management system.

* * * * *